United States Patent
D'Adamo

[11] Patent Number: 6,056,347
[45] Date of Patent: May 2, 2000

[54] PROTECTIVE COVER FOR A VEHICLE

[76] Inventor: Bruce D'Adamo, One Rose Ter., Chatham, N.J. 07928

[21] Appl. No.: 09/075,563

[22] Filed: May 11, 1998

[51] Int. Cl.$^7$ ........................................ B60J 11/00
[52] U.S. Cl. ............................................. 296/136
[58] Field of Search ................ 296/95.1, 98, 136; 150/166, 168; 52/2.22, 2.23, 3, 5

[56] References Cited

U.S. PATENT DOCUMENTS

| | | | |
|---|---|---|---|
| 1,691,379 | 11/1928 | Christ . | |
| 4,432,581 | 2/1984 | Guma | 296/136 |
| 4,519,644 | 5/1985 | Song | 150/166 |
| 4,825,889 | 5/1989 | Monteith | 296/136 |
| 4,944,321 | 7/1990 | Moyet-Ortiz | 135/88 |
| 4,951,993 | 8/1990 | Taboada | 296/136 |
| 5,013,079 | 5/1991 | Ho | 296/136 |
| 5,040,557 | 8/1991 | Morgan | 135/88 |
| 5,056,839 | 10/1991 | Yoon | 293/117 |
| 5,176,421 | 1/1993 | Fasiska | 296/136 |
| 5,242,206 | 9/1993 | Heck | 296/136 |
| 5,350,000 | 9/1994 | Wang | 296/136 |
| 5,364,156 | 11/1994 | Zerow | 296/136 |
| 5,413,396 | 5/1995 | Poznansky | 296/136 |
| 5,472,257 | 12/1995 | Kaya | 296/136 |
| 5,474,185 | 12/1995 | Franke | 206/586 |
| 5,497,819 | 3/1996 | Chiang | 150/166 |
| 5,501,502 | 3/1996 | Wang | 296/136 |
| 5,518,289 | 5/1996 | Cobble | 296/136 |
| 5,890,525 | 4/1999 | Shores | 296/136 |

*Primary Examiner*—Russell D. Stormer
*Assistant Examiner*—Lori L. Coletta
*Attorney, Agent, or Firm*—LaMorte & Associates

[57] ABSTRACT

A device for covering a vehicle so as to protect the vehicle from the elements. The device includes a water impermeable cover having a top surface and a bottom surface that are defined between a front edge, a back edge and two side edges. A plurality of formers are coupled to the bottom surface of the cover. The formers support the cover above the surface of the vehicle, thereby preventing direct contact between the material of the cover and the vehicle itself. Protrusions extend from the bottom of the formers. The protrusions contact the vehicle and support the formers a predetermined height above the vehicle when the inflatable formers are laid across the vehicle. The protrusions are spaced apart along the length of each of the formers. The protrusions define gaps between the formers and the vehicle through which air can flow. Air is therefore free to flow under the protective cover, thereby keeping the vehicle cool and preventing moisture from accumulating against the finish of the vehicle.

18 Claims, 5 Drawing Sheets

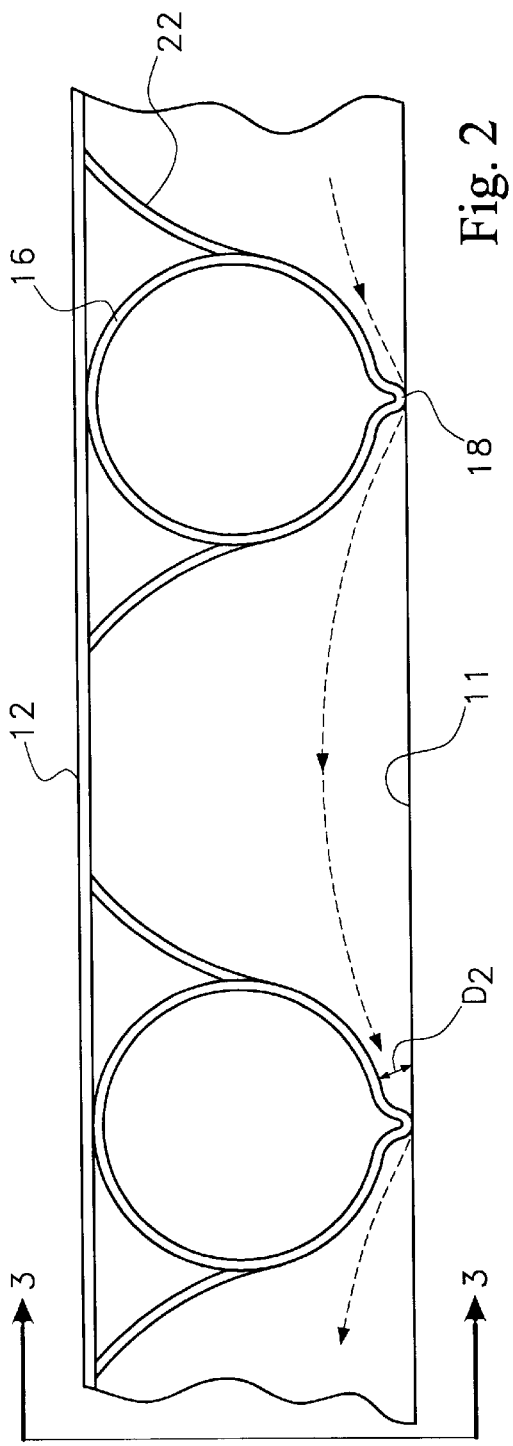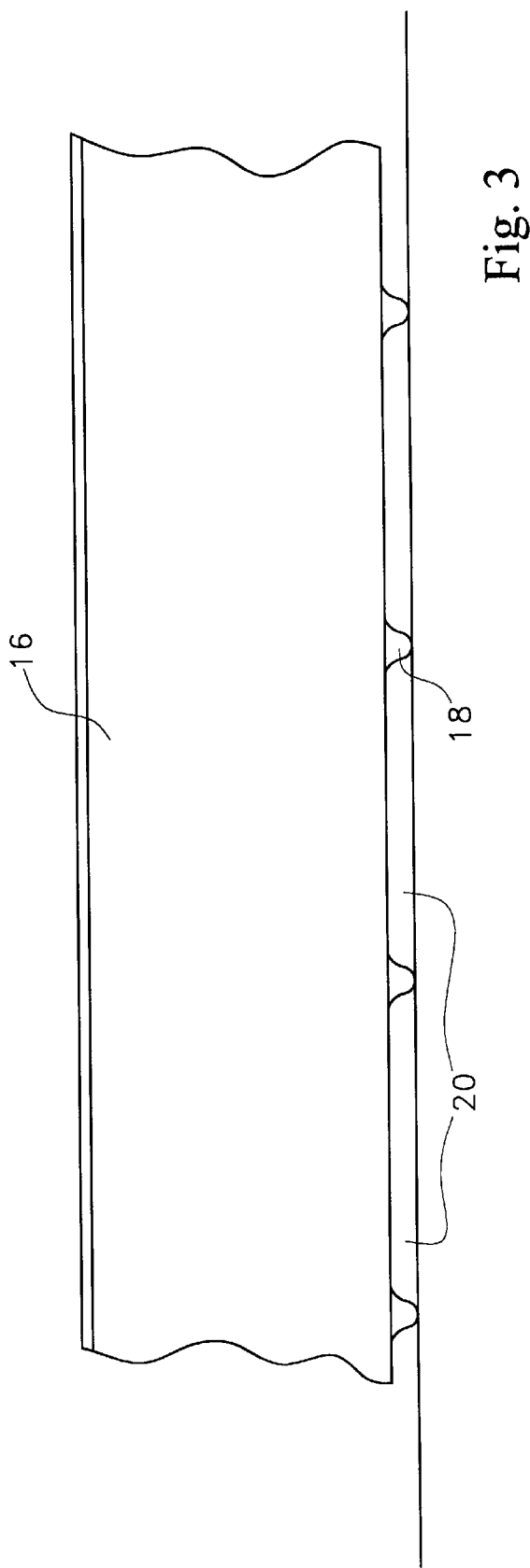

PROTECTIVE COVER FOR A VEHICLE

BACKGROUND OF THE INVENTION

1. Field of the Invention

The present invention relates to devices and methods for covering vehicles, such as automobiles, so as to protect the vehicle from harmful exposure to the elements and extremes in temperature. More specifically, the present invention relates to a vehicle cover that provides an opaque, water impermeable barrier around the exterior surfaces of a vehicle.

2. Description of the Prior Art

The prior art record is replete with many different types of vehicle covers. The primary purpose of a vehicle cover is to protect the finish of a vehicle from the harmful effects of the elements. Vehicle covers provide a barrier that shields the finish of a vehicle from rain, snow, hail, pollution, dirt, blowing sand and the like. Furthermore, many vehicle covers are opaque, thereby protecting the finish of a vehicle from the harmful effects of the sun. In many circumstances, the vehicle cover has a white color. This helps reflect the heat of the sun and keeps the underlying vehicle cool.

In the prior art, there are many different vehicle covers where the material of the cover lays directly on the vehicle. Such prior art covers are exemplified by U.S. Pat. No. 5,176,421 to Fasiska, entitled Automobile Cover System and U.S. Pat. No. 5,056,839 to Yoon, entitled Automobile Cover Assembly. A problem associated with such vehicle covers is that they entrap moisture and contaminants between the exterior of the vehicle and the cover. The trapped moisture and contaminants can then cause harm to the finish of the vehicle. Another problem associated with such vehicle covers is that since the cover is directly contacting the finish of the vehicle, any movement in the cover cause by wind will cause the cover to chafe against the vehicle. This can cause scratches in the finish of the vehicle. Since such prior art covers do not allow air to flow between the cover and the vehicle, heat can become trapped under the cover and raise the extremes in temperature to which the vehicle is exposed.

To avoid the above stated problems, vehicle covers have been invented where the cover is raised away from the surface of the vehicle it protects. Such prior art cover devices are exemplified by U.S. Pat. No. 5,501,502 to Wang, entitled Foldable Vehicle Cover and U.S. Pat. No. 5,040,557 to Morgan entitled Vehicle cover system. Such prior art cover systems typically use rigid supports in order to suspend the cover over the vehicle. Consequently, such prior art cover device tend to be heavy, bulky and hard to install.

A need therefore exists in the art for a lightweight, compact vehicle cover that is easy to install and supports a cover above the surface of a vehicle. This need is met by the present invention as described and claimed below.

SUMMARY OF THE INVENTION

The present invention is a device for covering a vehicle so as to protect the vehicle from the elements. The device includes a water impermeable cover having a top surface and a bottom surface that are defined between a front edge, a back edge and two side edges. The cover may include seams so that the cover accurately conforms to the shape of the vehicle it is covering. A plurality of formers are coupled to the bottom surface of the cover. The formers can be either solid or inflatable. Each of the formers extend from a point proximate one side edge of the cover to a point proximate the opposite side edge. The formers support the cover above the surface of the vehicle, thereby preventing direct contact between the material of the cover and the vehicle itself. Protrusions extend from the bottom of the formers. The protrusions contact the vehicle and support the formers a predetermined height above the vehicle when the formers are laid across the vehicle. The protrusions are spaced apart along the length of each of the formers. The protrusions define gaps between the formers and the vehicle through which air can flow. Air is therefore free to flow under the protective cover, thereby keeping the vehicle cool and preventing moisture from accumulating against the finish of the vehicle.

BRIEF DESCRIPTION OF THE DRAWINGS

For a better understanding of the present invention, reference is made to the following description of exemplary embodiments thereof, considered in conjunction with the accompanying drawings, in which:

FIG. 2 is an enlarged view of the segment of the embodiment of the vehicle cover shown in area 24 of FIG. 1;

FIG. 3 is a side view of the area shown in FIG. 2, viewed along section line 3—3;

DETAILED DESCRIPTION OF THE INVENTION

Although the present invention device can be used to cover many different types of objects and vehicles, such as boats, trucks, motorcycles and the like, the present invention device is especially well suited for use in covering passenger automobiles. Consequently, by way of example, the present invention will be described in an application for covering a passenger automobile in order to set forth the best mode contemplated for the device.

Figure 1:
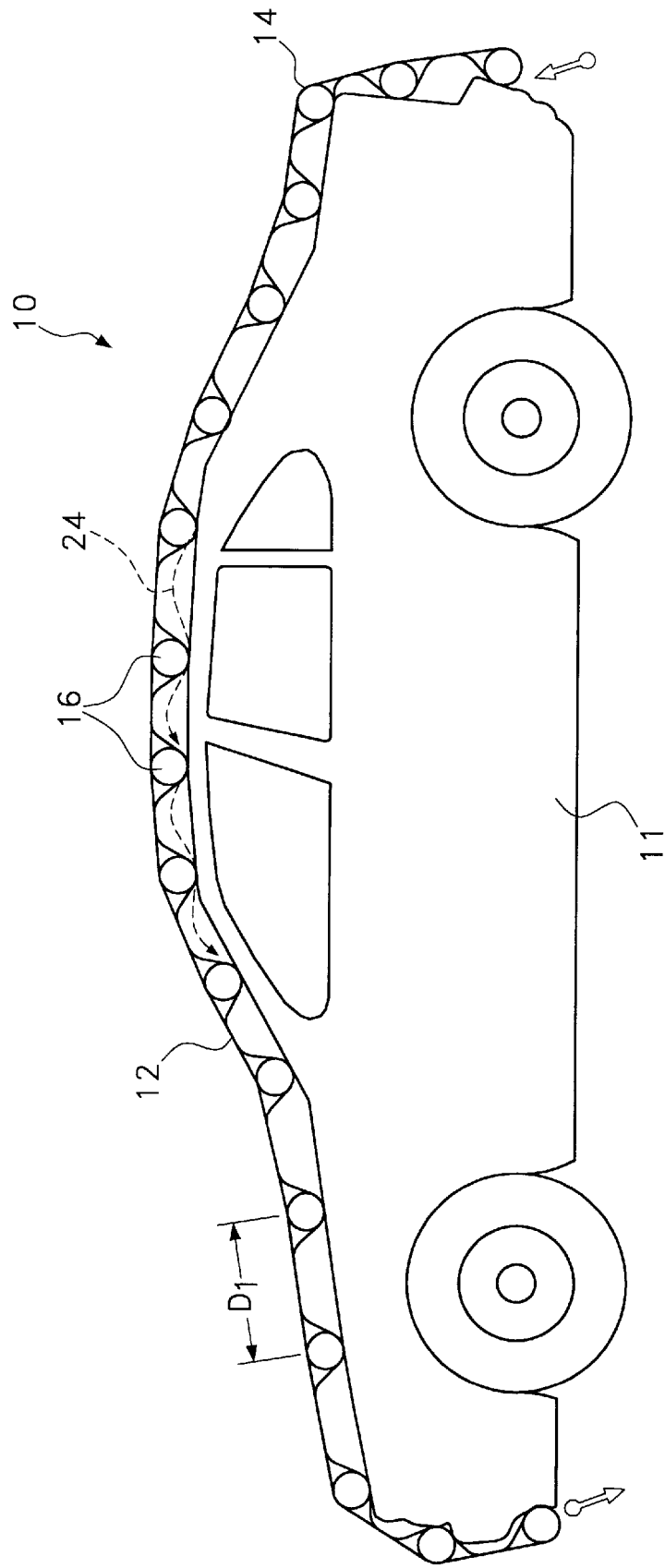
FIG. 1 is a cross-sectional view of a first preferred embodiment of the present invention vehicle cover, shown in conjunction with an automobile.

Referring to FIG. 1, a first preferred embodiment of the present invention cover device 10 is shown. The cover device 10 contains an outer tarp 12. The tarp 12 is a flexible cover that can be made of any conventional natural or synthetic material but is preferably water impermeable, opaque and light in color. The tarp 12 may contain seams 14 that enable the tarp 12 to conform to the general shape of a vehicle without folds and buckles in the tarp material. The tarp 12 also preferably contains a sealable flap that disposed down at least one side of the tarp 12. The sealable flap enables a person to enter the driver's side door of the vehicle when the cover device 10 is in place.

The tarp 12 does not contact the surface of the vehicle 11 directly. Rather, the tarp 12 is supported by a plurality of formers 16 that are disposed between the vehicle 11 and the tarp 12. The formers 16 are elongated elements that conform to the cross-sectional profile of the vehicle 11. The formers 16 can be made of any soft, flexible material such as foam, padded cloth or the like. However, in the shown embodiment, the formers 16 are inflatable structures that can be selectively inflated with air. Consequently, the formers 16 are preferably fabricated from an air impermeable material.

The number of formers 16 is proportional to the length and size of the vehicle 11 being covered. The number of formers 16 is preferably the minimum number needed to support the tarp 12 above the surface of the vehicle 11. Depending upon the thickness of the tarp 12, the distance D1 between formers 16 is typically between one foot and three feet. The formers 16 may have a cross-sectional diameter of between one inch and six inches. Consequently, the formers 16 support the tarp 12 above the surface of the vehicle 11 at a height of between one inch and six inches. In the preferred embodiment, the cross-sectional diameter of each former 16 is selected to be only what is needed support the tarp 12 above the surface of the vehicle 11. Small diameter formers are preferred because they are less expensive, inflate quickly and deflate quickly.

Referring to FIG. 2 and FIG. 3, it can be seen that the formers 16 themselves do not lay flush against the surface of the vehicle 11 being covered. Rather, the contact between the formers 16 and the surface of the vehicle 11 is minimized. Dimple elements 18, or similar protrusions, are disposed on the bottom surface of each of the formers 16. The dimple elements 18 are soft structures that will not damage the finish of the vehicle 11. The dimple elements 18 may be soft structures affixed to the bottom of the formers 16. However, in the preferred embodiment, the dimple elements 18 are manufactured as an integral part of the formers 16 and inflate with the formers 16. The dimple elements 18 support the main body of the formers 16 a predetermined distance D2 above the surface of the vehicle 11. The predetermined distance D2 is preferable between ¼ inch and 2 inches.

As is shown in FIG. 3, the dimple elements 18 are spaced apart along the length of the formers 16. As a result, the dimple elements 18 create air flow gaps 20 below each of the formers 16. Referring back to FIG. 2, it can be seen that the presence of the dimple elements 18 enable air to flow below the formers 16 across the surface of the vehicle 11. In FIG. 2, optional deflection baffles 22 are also shown lining the sides of the formers 16. The deflection baffles 22 extend from the bottom surface of the formers 16 up to the material of the tarp 12. The deflection baffles 22 direct the flow of air through the air flow gaps 20 (FIG. 3) between dimple elements 18. This enables air to flow between formers 16 with a minimum of resistance, and prevents air from damning up between formers 16.

Returning to FIG. 1, it will now be understood that the cover device 10 enables air to flow from one end of the cover device 10 to the other, as is indicated by arrows 24. The air that flows under the tarp 12 flows along the surface of the vehicle 11. Consequently, any moisture present on the surface of the vehicle 11 when the cover device 10 is put in place is free to evaporate and does not become entrapped under the tarp 12. Furthermore, ambient air surrounding the cover device 10 is free to flow under the tarp 12. As a result, air under the tarp 12 will move with a breeze, thereby preventing heat from building up under the tarp 12 and damaging the finish of the vehicle 11.

Figure 4:
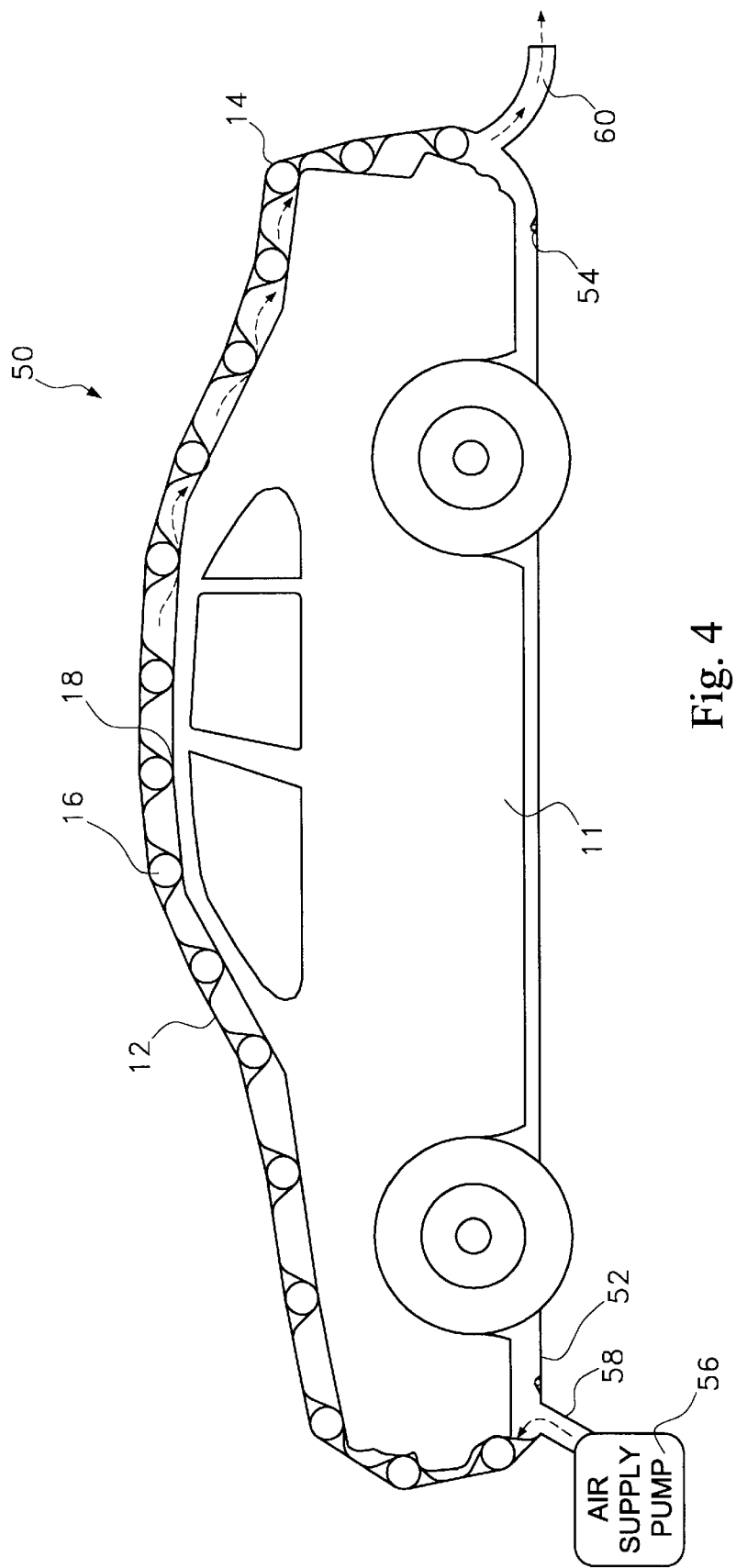
FIG. 4 is a side cross-sectional view of an alternative embodiment of a vehicle cover in accordance with the present invention.

Referring to FIG. 4, an alternate embodiment of a vehicle cover device 50 in accordance with the present invention is shown. In this embodiment, the cover device 50 contains a top tarp 12, formers 16 and dimple elements 18 in the same manner as was previously described. Accordingly, like reference numbers are used to describe these elements. The difference set forth in the embodiment of FIG. 4 is that the tarp section of the cover device 50 is sized so that the bottom edge 52 of the trap 12 extends below the bottom of the vehicle 11 being covered. An optional draw string 54 is fabricated into the bottom edge 52 of the tarp 12. The draw string 54 is used to tighten the base of the tarp 12 under the bottom of the vehicle 11. Although a draw string 54 is preferred, other tightening structures such as elastic, straps and buckles or the like could also be used. The effect of tightening the tarp 12 under the vehicle 11 is to restrict the free flow of ambient air under the cover device 50.

To compensate for the restricted flow of ambient air, a powered air supply 56 is coupled to the cover device 50. A connector port 58, 60 is provided at both the front of the cover device 50 and at the rear of the cover device 50. Each connector port 58, 60 provides a conduit into the space that lays within the cover device 50 between the tarp 12 and the surface of the vehicle 11. The powered air supply 56 pumps ambient air into the cover device 50, thereby raising the air pressure between the tarp 12 and the vehicle 11. The ambient air pumped into the cover device 50 flows toward the opposite access port 60. The flow of air also acts to evaporate any moisture that may have been trapped on the surface of the vehicle 11 when the cover device 50 was applied.

As the air flows through the cover device 50, the air can act to either warm or cool the vehicle 11. If the powered air supply 56 is connected to the connector port 58 is the front of the tarp 12, the air flowing over the vehicle 11 must first flow over the engine of the vehicle 12. If the engine of the vehicle 11 is running, heat from the engine can be spread across the vehicle, thereby warming the vehicle 11. Alternatively, a secondary heating unit (not shown) or cooling unit (not shown) can be coupled to the powered air supply. This would enable either heated air or cooled air to flow over the surface of the vehicle 11, thereby either heating or cooling the vehicle.

It will be understood that the connector port 60 through which the pump air exits the cover device 50 can be connected back to the powered air supply 56, thereby creating a continuous loop if so desired. A continuous loop is preferred when the air being pumped over the vehicle is being used to either heat or cool the vehicle 11.

Figure 5:
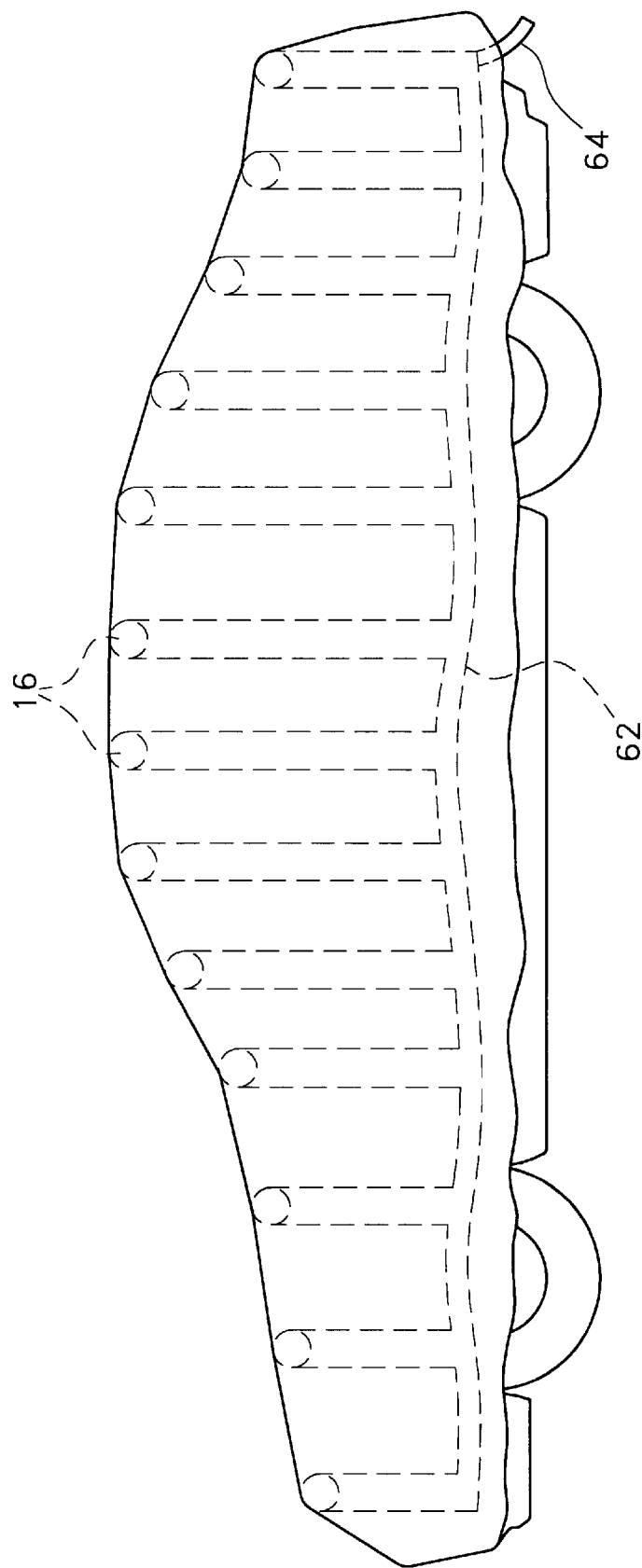
FIG. 5 is a side view of a second alternative embodiment of a vehicle cover in accordance with the present invention.

Referring to FIG. 5, it will be understood that if the formers 16 were inflatable structures, each of the formers 16 would have a closable fill port through which that former 16 can be inflated and deflated. Alternatively, a single conduit 62 can be formed in the cover device that interconnects all of the formers 16. In such a structure, only a single fill port 64 would have to be provided. As air was added to the fill port 64, the air would flow into all of the formers 16 simultaneously. Similarly, if the fill port 64 were opened, air would drain from each of the formers 16 simultaneously.

The formers 16 can be inflated either by mouth or by use of a pump. A preferred pump would be an electric pump that can be connected to the cigarette port within the vehicle 11. When the vehicle cover is not in use, the formers 16 can be left inflated. However, to fully compact the cover device, the formers 16 are deflated.

Since the cover device uses inflatable formers 16, the overall cover device is very lightweight. Furthermore, upon the deflation of the formers 16, the vehicle cover can be folded into a very small volume for easy storage and handling.

Figure 6:
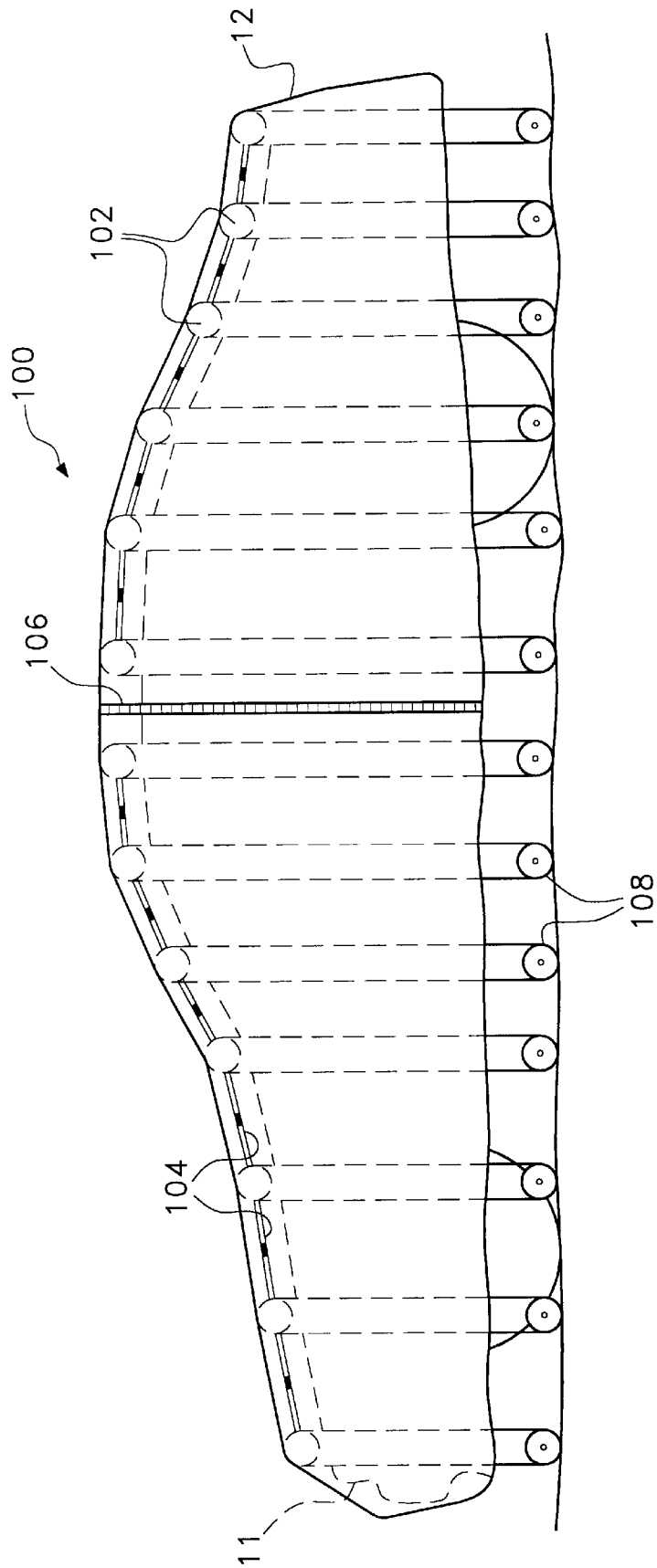
FIG. 6 is a side view of a third alternate embodiment of a vehicle cover in accordance with the present invention.

Referring to FIG. 6, an alternate embodiment of the present invention vehicle cover 100 is shown. In this embodiment, rigid formers 102 are used in place of the inflatable formers previously described. The rigid formers 102 support the tarp 12 above the surface of the vehicle in the same manner as did the inflatable formers. The rigid formers 102 conform to the shape of the vehicle 11. The formers 102 are preferably arranged in two sets. One set covers the front portion of the vehicle 11 and the second set covers the rear portion of the vehicle 11. Each of the rigid formers 102 in each set can be interconnected by a foldable linkage 104. The foldable linkages 104 enable each set of formers 102 to be folded together in a compact collection when not in use. To use the vehicle cover 100, both sets of formers are opened and placed over the front and rear of the vehicle 11, respectively. The tarp 12 is then joined together at a seam 106, via a zipper, Velcro or some other fastening means.

The rigid formers 102 may contain small protrusions that contact the surface of the vehicle 11. However, in the shown embodiment, the rigid formers 102 are supported by casters 108 on the ground that hold the rigid formers 102 just over the surface of the vehicle 11.

It will be understood that a person skilled in the art of vehicle covers could make alternate embodiments of the present invention using functionally equivalent components that have not been specifically described. For example, the size, shape, number and location of the formers can be changed as desired. All such obvious modifications are intended to be included in the scope of this disclosure as defined by the appended claims.

What is claimed is:

1. A cover device for a vehicle, comprising:
   a flexible cover;
   a plurality of formers extending from said flexible cover, wherein said formers support said flexible cover above the vehicle;
   a plurality of protrusions extending from said formers, wherein said protrusions contact the vehicle and support the formers a predetermined height above the vehicle when the formers are laid across the vehicle.

2. The device according to claim 1, wherein said flexible formers are inflatable.

3. The device according to claim 1, wherein said protrusions are spaced apart along the length of each of said formers, thereby defining gaps between the formers and the vehicle being covered through which air can flow.

4. The device according to claim 3, further including deflection baffles for directing air flowing under said flexible cover through said gaps.

5. The device according to claim 1, wherein said flexible cover is water impermeable and light in color.

6. The device according to claim 1, wherein said formers have a height between one inch and six inches.

7. The device according to claim 1, wherein each of said formers are joined by a common air conduit.

8. The device according to claim 1, wherein said flexible cover has a front end, a rear end and side ends that extend between said front end and said rear end.

9. The device according to claim 8, further including at least one access port proximate said front end and said rear end that enables air to flow under said flexible cover.

10. The device according to claim 9, further including a powered air supply coupled to at least one of said access ports for pumping air under said flexible cover.

11. The device according to claim 8, wherein said formers are arranged in parallel and extend from one of said side ends to the other.

12. The device according to claim 8, wherein said flexible cover has a peripheral edge and includes a tightening device for tightening said peripheral edge around the bottom of a vehicle.

13. The device according to claim 12, wherein said tightening device is a draw string.

14. A device for covering a vehicle, comprising:
    a water impermeable cover having a top surface and a bottom surface defined between a front edge, a back edge and two side edges; and
    a plurality of inflatable formers coupled to said bottom surface of said cover, wherein each of said formers extend from a point proximate one side edge to a point proximate the opposite side edge;
    a plurality of protrusions extending from said inflatable formers, wherein said protrusions contact the vehicle and support the inflatable formers a predetermined height above the vehicle when the inflatable formers are laid across the vehicle.

15. The device according to claim 14, wherein said protrusions are spaced apart along the length of each of said inflatable formers, thereby defining gaps between the inflatable formers and the vehicle being covered through which air can flow.

16. The device according to claim 15, further including deflection baffles for directing air flowing under said cover through said gaps.

17. The device according to claim 14, wherein each of said inflatable formers are joined by a common air conduit.

18. The device according to claim 14, further including an air pump for pumping air under said cover.

\* \* \* \* \*